Figure 1:
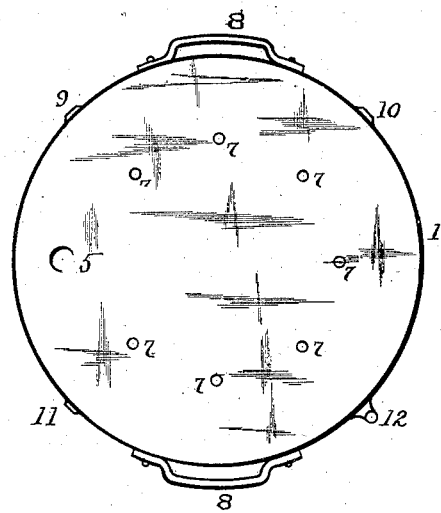

No. 656,392. Patented Aug. 21, 1900.
J. COOK.
DISH MOLD.
(Application filed Dec. 15, 1899.)

(No Model.)

Witnesses:
A. D. Alexander
H. L. Good.

Inventor:
Joseph Cook,
by Humphrey & Humphrey
Attys.

THE NORRIS PETERS CO., PHOTO-LITHO., WASHINGTON, D. C.

UNITED STATES PATENT OFFICE.

JOSEPH COOK, OF AKRON, OHIO.

DISH-MOLD.

SPECIFICATION forming part of Letters Patent No. 656,392, dated August 21, 1900.

Application filed December 15, 1899. Serial No. 740,423. (No model.)

*To all whom it may concern:*

Be it known that I, JOSEPH COOK, a citizen of the United States, residing at Akron, in the county of Summit and State of Ohio, have invented a certain new and useful Improvement in Dish-Molds, of which the following is a specification.

My invention has relation to improvements in molds for forming dishes of plastic clay. Heretofore molds have been used for forming dishes of circular outline wherein a female revolving mold held the clay, which was rubbed to place by hand or a mechanically-operated tool. Other molds have been used for dishes of outline other than circular, in which while standing motionless the clay was similarly spread, while in a third form a male and female mold was formed of plaster-of-paris, each inclosed in a metallic hoop, the two molds being adapted to register by means of shallow conical holes in the plaster of one mold to receive points that project from the opposite mold and which are formed by the plaster flowing into the holes in the first mold. None of these various devices have been entirely successful or satisfactory to form irregularly-shaped ware with ornamental interior and exterior, the revolving class being limited to a circular outline and an ornamental exterior, the motionless class being similarly limited in the form of its product, while in the third class the outside bottom of the mold quickly wore away in use, causing an uneven surface, so that the resistance to the pressure was not the same at all points, and as a consequence the molds soon cracked and crushed under the pressure necessary to form the ware, while the plaster points and holes to secure accurate registration of the two parts of the mold from their friable nature rapidly wore away in use, thus permitting lateral displacement to a greater or less extent, prevented accurate meeting of the molds, and consequent imperfection in the pressed article. A further objection was found in the fact that no provision was made for the escape of surplus clay and a fin or web was formed about the ware that had to be removed by a later process.

The objects of my invention are to overcome these several objections by causing the molds to accurately register, reinforcing and strengthening the outside bottom and top of the molds to prevent wear and afford strength to resist the strain in pressing, and to provide means for the escape of the surplus material that would prevent the molds coming completely together.

To the aforesaid objects my invention consists in the peculiar and novel construction, arrangement, and combination of parts hereinafter described and then specifically pointed out in the claims, reference being had to the accompanying drawings, forming a part of this specification.

Figure 2:
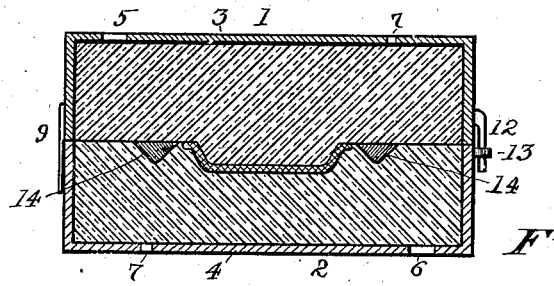
Figure 3:
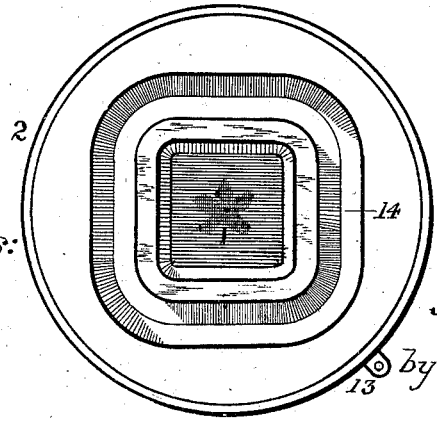

In the accompanying drawings, in which similar reference-numerals indicate like parts in the different figures, Figure 1 is a plan of my improved mold; Fig. 2, a central section of the same, and Fig. 3 a plan of the lower or female mold with the upper mold removed.

Referring to the figures, 1 is the shell or cope of the upper mold, and 2 the shell or drag of the lower mold. These shells consist of metallic vessels, preferably of heavy sheet-iron, each having a bottom or head 3 4, respectively, each head provided with pouring-holes 5 6 and vent-holes 7, arranged at intervals. The upper shell 1 is provided with handles 8, by which it may be manipulated, and has at intervals on the outside a series of depending guide-pins 9 10 11 12. These pins 9, 10, and 11 simply project down flush with the outer periphery of the shells, so as to inclose the lower shell closely. The pin 12 is offset and is adapted to enter a bracket 13 on the lower shell. This distinction enables the workman to place the molds accurately together without mistake, so that the two molds will register, and thus prevent wearing of the molds.

For the purpose of illustration a mold for a square dish is shown. To form the mold, a pattern-dish is placed inverted on a flat surface properly coated with material to cause the plaster to separate from it. The lower shell is inverted and placed over it and plaster moistened to a creamy consistency poured through the hole 6 until the shell is full, the air escaping through the holes 7. When the plaster has suitably hardened or set, the whole is turned over, and suitable parting substance having been spread over it the upper shell is placed upon it and similarly filled with plaster. When the plaster in the upper has hardened, it is lifted off, the pattern-dish removed, and around one mold and close to its outer outline is cut a channel 14 to form a receptacle for the surplus clay. In the drawings this channel is shown in the female mold; but it may be in the upper, the character of the article to be made usually determining its location. In operation when both halves of the mold have been dried and hardened a mass of plastic clay is placed in the female mold, the upper mold is placed on it, and the two forced together by a powerful press of any suitable kind. By this operation a perfect dish is formed, any surplus clay escaping into the channel 14. The male die is then removed and the female die set aside until the dish is sufficiently dried and shrunk, while new female dies are successively substituted and the operation repeated. When the dish is sufficiently dry and shrunk, it is removed and prepared for burning by any of the well-known processes of glazing or ornamenting.

The number of female molds in use will of course depend upon the amount of ware the manufacturer desires to produce, as each must be idle during the drying process.

Handles have only been shown on the upper shell; but where the shells are of great size handles may be necessary on the lower shells. The shells are shown round; but in some forms, as in large platters, this shape will be modified to prevent a useless waste of plaster.

I claim as my invention—

1. An improved mold-shell for forming earthenware dishes consisting of upper and lower metallic shells having a top and bottom respectively with pouring and vent holes in said bottom and top, and guide-pins about one shell arranged to fit the other, one of said pins being different from the others and a socket in the opposite shell adapted to receive it, substantially as shown and described.

2. An improved mold for forming earthenware dishes consisting of upper and lower metallic shells having a top and bottom respectively with pouring and vent holes in said bottom and top and means for securing registration of said shells, and plaster-molds inclosed in said shells, substantially as shown and described.

In testimony that I claim the above I hereunto set my hand in the presence of two witnesses.

JOSEPH COOK.

In presence of—
C. P. HUMPHREY,
C. E. HUMPHREY.